(12) United States Patent
Hasegawa et al.

(10) Patent No.: US 11,518,275 B2
(45) Date of Patent: Dec. 6, 2022

(54) FUEL CELL VEHICLE

(71) Applicant: TOYOTA JIDOSHA KABUSHIKI KAISHA, Toyota (JP)

(72) Inventors: Takahiko Hasegawa, Toyota (JP); Takashi Harayama, Toyota (JP); Ayano Asai, Anjo (JP); Koji Terashima, Nagoya (JP); Shigeaki Murata, Nisshin (JP); Tomio Yamanaka, Nagoya (JP); Syun Yoshida, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 17/135,300

(22) Filed: Dec. 28, 2020

(65) Prior Publication Data

US 2021/0206293 A1 Jul. 8, 2021

(30) Foreign Application Priority Data

Jan. 6, 2020 (JP) .............................. JP2020-000342

(51) Int. Cl.
  *B60L 8/00* (2006.01)
  *H01M 2/02* (2006.01)
  *B60L 58/30* (2019.01)

(52) U.S. Cl.
  CPC .................... *B60L 58/30* (2019.02)

(58) Field of Classification Search
  CPC .......... Y02T 10/72; Y02T 90/40; B60L 58/30; H01M 8/04313; H01M 8/0432; H01M 2250/20; H01M 8/04492; H01M 8/04291
  See application file for complete search history.

(56) References Cited

U.S. PATENT DOCUMENTS

| 10,906,624 | B1* | 2/2021 | MacPherson | E03F 5/22 |
| 2002/0094467 | A1* | 7/2002 | Nonobe | H01M 8/04753 |
| | | | | 429/432 |
| 2007/0000702 | A1* | 1/2007 | Yoshida | B60K 1/00 |
| | | | | 429/442 |
| 2010/0279191 | A1* | 11/2010 | Matsuura | H01M 8/04164 |
| | | | | 429/514 |

FOREIGN PATENT DOCUMENTS

JP 2018-98039 A 6/2018

* cited by examiner

*Primary Examiner* — Jared Fureman
*Assistant Examiner* — Esayas G Yeshaw
(74) *Attorney, Agent, or Firm* — Oliff PLC

(57) ABSTRACT

A fuel cell vehicle includes: a fuel cell; a storage portion to store produced water that is produced as a result of power generation by the fuel cell; a drainage valve for switching between a storage state and a drainage state of discharging the produced water from the storage portion to the outside of the fuel cell vehicle; a road information acquisition portion configured to acquire road information on roads on which the fuel cell vehicle travels; and a controller configured to drainage valve control operation. The controller sets a road region meeting a first condition defined in advance regarding road information and that permits the drainage state as a first road region where the drainage state is permitted, and the controller performs drainage if a drainage implementation condition defined in advance, including traveling of the fuel cell vehicle in the first road region, is fulfilled.

4 Claims, 10 Drawing Sheets

FUEL CELL VEHICLE

CROSS-REFERENCE TO RELATED APPLICATIONS

This application claims priority based on Japanese patent application 2020-342 filed on Jan. 6, 2020, the disclosure of which is hereby incorporated in its entirety by reference into this application.

BACKGROUND

Field

This disclosure relates to a fuel cell vehicle.

Related Art

Japanese Unexamined Patent Application Publication No. 2018-098039 discloses a fuel cell vehicle that discharges produced water which is produced as a result of power generation by a fuel cell to the outside.

Japanese Unexamined Patent Application Publication No. 2018-098039 does not give any consideration to the place where the produced water is to be discharged. However, there may be a road region where drainage is desired, such as a road region where the produced water is desired to be drained as an alternative to water sprinkling, for example. Thus, a technique allowing discharge of the produced water to the outside of a fuel cell vehicle in an appropriate road region is desired.

SUMMARY

This disclosure is feasible in the following aspects.

According to an aspect of this disclosure, a fuel cell vehicle is provided. The fuel cell vehicle includes: a fuel cell; a storage portion configured to store produced water that is produced as a result of power generation by the fuel cell; a drainage valve for switching between a storage state of storing the produced water in the storage portion and a drainage state of discharging the produced water from the storage portion to the outside of the fuel cell vehicle; a road information acquisition portion configured to acquire road information about roads on which the fuel cell vehicle travels; and a controller configured to control operation of the drainage valve. The controller sets a road region meeting a first condition (defined in advance) regarding road information, that permits the drainage state as a first road region where the drainage state is permitted, and the controller performs drainage if a drainage implementation condition defined in advance, including traveling of the fuel cell vehicle in the first road region, is fulfilled.

DETAILED DESCRIPTION

A. First Embodiment

A-1. Device Configuration

Figure 1:
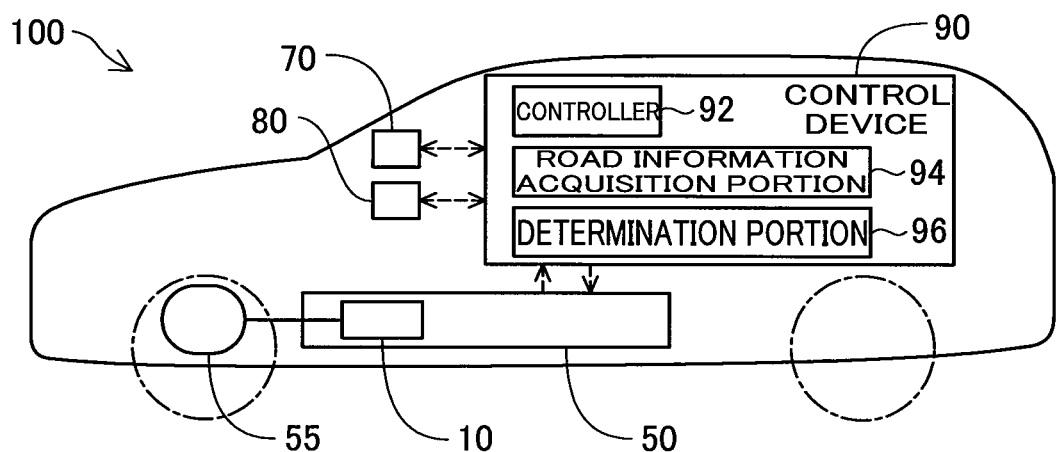
FIG. 1 is a block diagram showing a schematic configuration of a fuel cell vehicle.

FIG. 1 is a block diagram showing a schematic configuration of a fuel cell vehicle 100 according to an embodiment of this disclosure. The fuel cell vehicle 100 includes a fuel cell system 50 including a fuel cell 10, a traveling motor 55, a navigation device 70, a communication device 80, and a control device 90. The fuel cell vehicle 100 is driven by the traveling motor 55 having received supply of electric power from the fuel cell 10.

Figure 2:
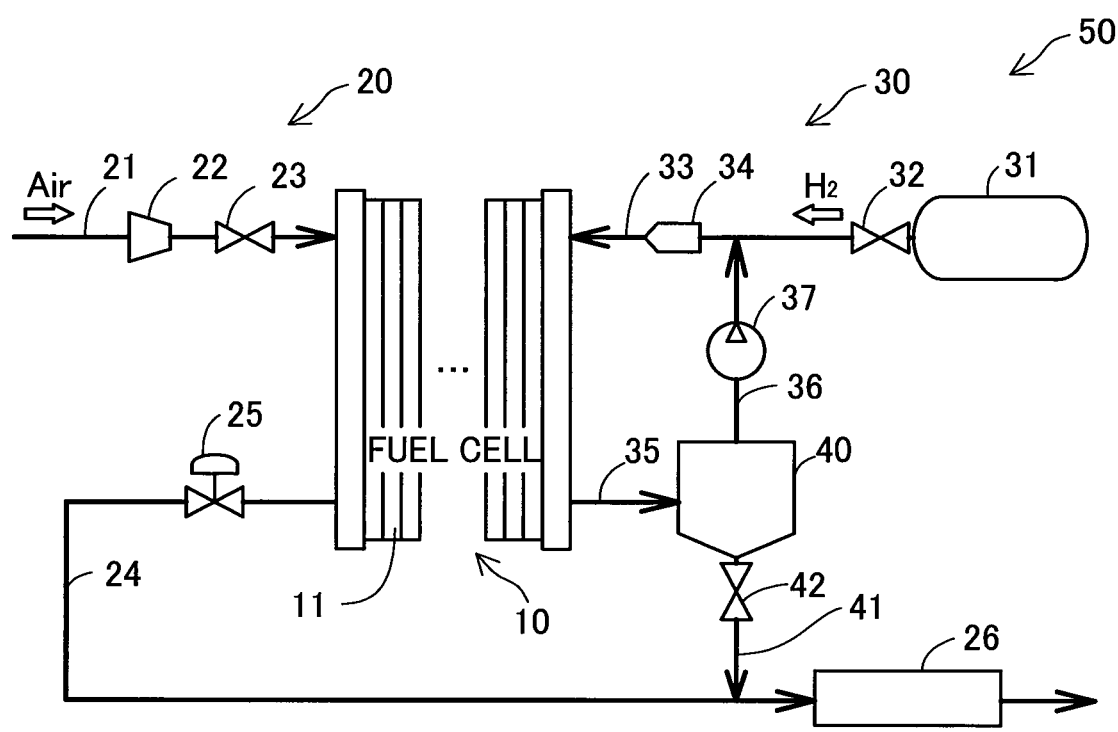
FIG. 2 is an explanatory view showing a schematic configuration of a fuel cell system.

FIG. 2 is an explanatory view showing a schematic configuration of the fuel cell system 50. The fuel cell system 50 includes the fuel cell 10, an air supply and discharge system 20, and a hydrogen supply and discharge system 30.

The fuel cell 10 is configured using a so-called 'solid polymer fuel cell', and generates power in response to the supply of hydrogen as a fuel gas and air containing oxygen as an oxidizing gas. The fuel cell 10 has a stacked structure with a plurality of portion cells 11. Each portion cell includes a membrane electrode assembly with electrodes arranged on the opposite sides of an electrolyte membrane, and a pair of separators between which the membrane electrode assembly is caught. An anode flow path for the passage of hydrogen is formed between the membrane electrode assembly and the separator on the anode side. A cathode flow path for the passage of the oxidizing gas is formed between the membrane electrode assembly and the separator on the cathode side.

The air supply and discharge system 20 supplies and discharges air to and from the fuel cell 10. The air supply and discharge system 20 includes an air supply flow path 21, a compressor 22, an open/shut valve 23, an air discharge flow path 24, a pressure adjusting valve 25, and a muffler 26. The air supply flow path 21 communicates with external air on one end, and connects to an inlet of the cathode flow path formed in the fuel cell 10 on the other end. The compressor 22 compresses external air taken in through the one end of the air supply flow path 21 and feeds the compressed air toward the open/shut valve 23 on the other end side of the air supply flow path 21 in response to a command from a controller 92 of the control device 90 described later. The open/shut valve 23 is normally in a closed state, and is opened by the pressure of the compressed gas fed from the compressor 22 to permit flow of the compressed gas into the cathode of the fuel cell 10.

The air discharge flow path 24 is a flow path connected to an outlet of the cathode flow path formed in the fuel cell 10 and used for guiding cathode discharge gas discharged from the cathode of the fuel cell 10 to the outside of the fuel cell system 50. The pressure adjusting valve 25 is provided in the air discharge flow path 24 and is used for adjusting the cathode-side back pressure of the fuel cell 10 in response to a command from the controller 92. The muffler 26 is provided in the air discharge flow path 24 for silencing. An exhaust and drainage flow path 41 described later is connected to the air discharge flow path 24 upstream from the muffler 26.

The hydrogen supply and discharge system 30 supplies hydrogen from a hydrogen tank 31 to the fuel cell 10 and discharges hydrogen from the fuel cell 10. The hydrogen supply and discharge system 30 includes the hydrogen tank 31, a main stop valve 32, a hydrogen supply flow path 33, an injector 34, a hydrogen discharge flow path 35, a gas-liquid separator 40, a circulation flow path 36, a hydrogen pump 37, the exhaust and drainage flow path 41, and a drainage valve 42.

The hydrogen tank 31 stores hydrogen to be supplied to the fuel cell 10. The main stop valve 32 is provided at a ferrule of the hydrogen tank 31 and is opened and closed in response to an instruction from the controller 92. The hydrogen supply flow path 33 is a flow path connecting the hydrogen tank 31 and an inlet of the anode flow path formed in the fuel cell 10. The injector 34 is provided in the hydrogen supply flow path 33, and is driven according to a driving cycle or valve-opening time set by the controller 92 to inject hydrogen.

The hydrogen discharge flow path 35 forms a flow path for anode discharge gas discharged from the anode formed in the fuel cell 10. The anode discharge gas contains impure gas such as nitrogen gas and produced water which is produced as a result of power generation by the fuel cell 10, in addition to hydrogen that was not used in the electrochemical reaction. The gas-liquid separator 40 separates unconsumed hydrogen contained in the anode discharge gas and the produced water. The separated produced water is stored in the gas-liquid separator 40. The circulation flow path 36 connects the gas-liquid separator 40 and the part of the hydrogen supply flow path 33 father from the fuel cell 10 than the injector 34. The hydrogen pump 37 is arranged in the circulation flow path 36 and is used for the circulation of hydrogen separated from the anode discharge gas through the hydrogen supply flow path 33. The exhaust and drainage flow path 41 is a flow path connecting the gas-liquid separator 40 and the muffler 26. The drainage valve 42 is arranged in the exhaust and drainage flow path 41. The drainage valve 42 is composed of a diaphragm valve, for example. The drainage valve 42 is normally closed and is opened in response to a command from the controller 92. When the drainage valve 42 is closed, produced water is stored in the gas-liquid separator 40. In the following description, the closed state of the drainage valve 42 will also be called a "storage state." In response to the opening of the drainage valve 42, the produced water stored in the gas-liquid separator 40 is discharged as drainage to the outside of the fuel cell system 50 through the exhaust and drainage flow path 41 and the muffler 26. In the following description, the opened state of the drainage valve 42 will also be called a "drainage state."

The navigation device 70 shown in FIG. 1 includes a global navigation satellite system (GNSS) receiver. The navigation device 70 acquires current positional information indicating a current position of the fuel cell vehicle 100 on the basis of a navigation signal received from an artificial satellite forming the GNSS. The current positional information acquired by the navigation device 70 is transmitted to the controller 92. The navigation device 70 contains map information stored in advance. This map information includes road information in addition to a map. In the first embodiment, the road information includes information such as road types, road speed limits, road gradients, bridges, tunnels, railroad crossings, information about road regions where water sprinkling is recommended, information about road regions where drying is desirably avoided, etc. Road types include expressways, automobile roads, gravel roads, etc. The navigation device 70 may include destination information set by a passenger of the fuel cell vehicle 100. The map information possessed by the navigation device 70 is transmitted to a road information acquisition portion 94.

The communication device 80 performs radio communication with an external center such as an intelligent transport system and performs vehicle-to-vehicle communication with other vehicles. The communication device 80 acquires weather forecast or season information about an area including a current position of the fuel cell vehicle 100 from the external center, for example, and transmits the acquired information to the road information acquisition portion 94. The season information is information based on a calendar, for example. Months from March to May may be defined as spring, months from June to August may be defined as summer, months from September to November may be defined as fall, and months from December to February may be defined as winter, for example. The season information includes information about an outside air temperature, and this outside air temperature is correlated with the road surface temperature of a road. The season information may be stored in advance in the control device 90. The communication device 80 may acquire the foregoing map information through radio communication at an interval or a predetermined period or in response to an instruction from a passenger or the external center.

The control device 90 is configured using a computer including a central processing portion (CPU), a random access memory (RAM), and a read only memory (ROM). The CPU executes a control program stored in advance in the ROM to function as the controller 92, the road information acquisition portion 94, and a determination portion 96.

The controller 92 controls the operation of the fuel cell vehicle 100 as a whole, including power generation by the fuel cell system 50. The controller 92 is electrically connected to the compressor 22, the open/shut valve 23, the pressure adjusting valve 25, the main stop valve 32, the injector 34, the hydrogen pump 37, and the drainage valve 42 in the fuel cell system 50 to control the respective operations of these portions. The controller 92 receives current positional information acquired by the navigation device 70. The controller 92 performs a drainage process described later.

The road information acquisition portion 94 acquires road information about roads on which the fuel cell vehicle 100 travels. More specifically, the road information acquisition portion 94 of the first embodiment acquires the road information by receiving and acquiring the map information possessed by the navigation device 70 and information acquired by the communication device 80, respectively.

The determination portion 96 determines a storage amount of produced water stored in the gas-liquid separator 40. In the first embodiment, the determination portion 96 determines a storage amount of produced water by estimation. More specifically, the determination portion 96 determines a storage amount by making an estimation using parameters such as the amount of power generated by the fuel cell 10, the water content, the water temperature, the partial water vapor pressure of reaction gas in the fuel cell 10, etc., and by using a known function expression or map. Instead of the estimation of a storage amount, a water level sensor may be provided at the gas-liquid separator 40 and the determination portion 96 may determine a storage amount on the basis of a detection signal from the water level sensor. The water level sensor, for example, is arranged at a position corresponding to a storage amount indicating a trigger for implementation of the drainage process.

A-2. Drainage Process

Figure 3:
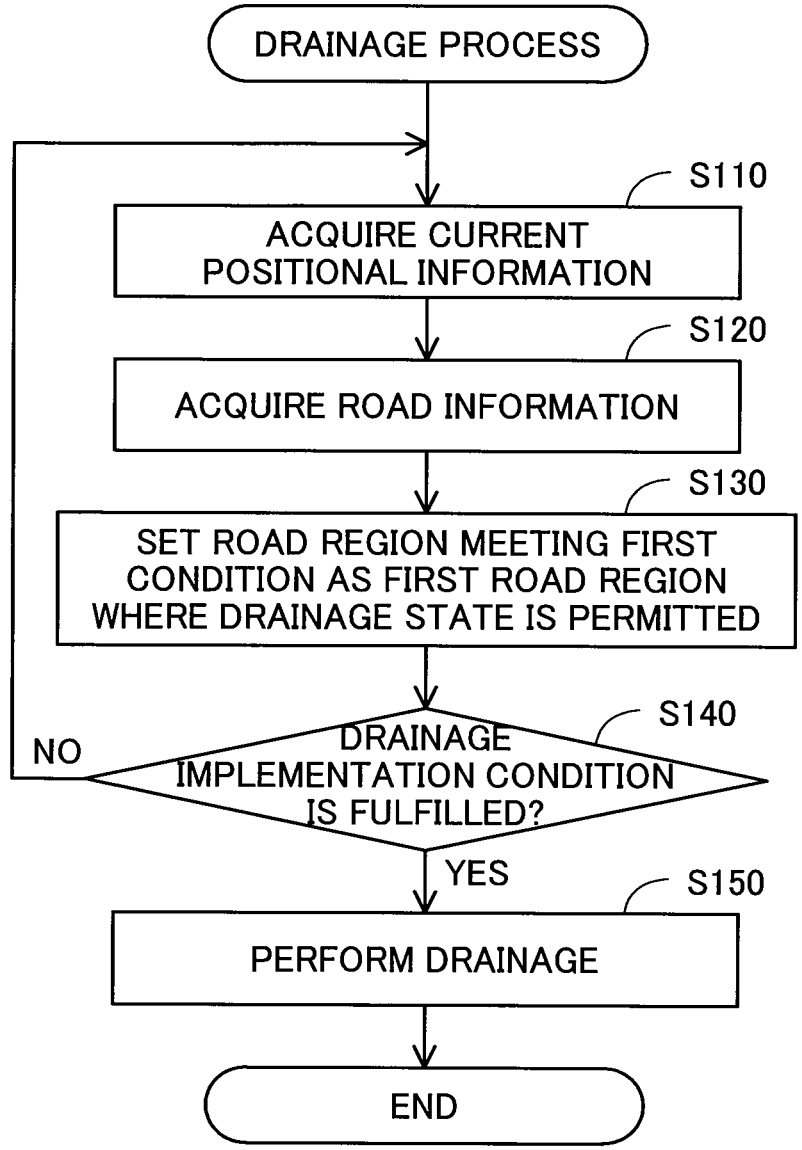
FIG. 3 is a flowchart showing a procedure of a drainage process.

FIG. 3 is a flowchart showing a procedure of the drainage process. The drainage process of the first embodiment is performed as a trigger in response to an excess in the storage amount of produced water stored in the gas-liquid separator 40 and determined by the determination portion 96 over a predetermined amount. This predetermined amount is set in advance as a value indicating a smaller amount than the permissible storage upper limit of produced water in the gas-liquid separator 40, and is stored in the ROM of the control device 90.

The controller 92 acquires current positional information from the navigation device 70 (step S110). The road information acquisition portion 94 acquires road information about roads on which the fuel cell vehicle 100 travels (step S120). In step S120, the road information acquisition portion 94 acquires road information about roads within a predetermined range centered on a current position of the fuel cell vehicle 100. The controller 92 sets a road region meeting a first condition as a first road region where the drainage state is permitted (step S130).

The first condition is defined in advance as a condition regarding road information, which permits the drainage state, and is stored in the ROM of the control device 90. The first condition may be acquired through the communication device 80 from the external center, for example. The first condition may be an OR condition such as conditions (a) to (c) described below, for example. Furthermore, the first condition may be set as one condition including a plurality of different conditions such as those from (a) to (c) as OR conditions.

(a) It being summer, it not being a crossing, and it being a road region where water sprinkling is recommended;

(b) It being spring or fall, and it not being a crossing; or (c) It being winter, and it being a road region which is not a crossing, and which is a flat area where the road gradient is equal to or less than 1%, and where the speed limit is equal to or less than a threshold defined in advance.

The controller 92 determines on the basis of a calendar whether the season is "summer," "spring or fall," or "winter." Further, the controller 92 determines on the basis of the map information possessed by the navigation device 70 that the road region is a region where water sprinkling is recommended, that the road region is not a crossing, that the road region is a flat area where the road gradient is equal to or less than 1%, or that the speed limit is equal to or less than a threshold defined in advance.

In summer, permitting drainage of produced water in a road region where water sprinkling is recommended achieves effective use of the produced water in the fuel cell 10, thereby allowing the suppression of temperature increase on a road surface by means of evaporation heat. Drainage of the produced water is not desirable at a crossing in any season. Thus, the inclusion of "not being a crossing" in the first condition prohibits drainage at a crossing. In winter, there is a risk of freezing of drained water on the road surface. Thus, permitting drainage of produced water in a road region less affected by freezing, namely, "a road region which is not a crossing, which is a flat area where the road gradient is equal to or less than 1%, and where the speed limit is equal to or less than a threshold defined in advance", allows suppression of safety deterioration. "A road region where the speed limit is equal to or less than a threshold defined in advance" means a road region where the speed limit is relatively low and may be a road region where the speed limit is equal to or less than 40 km/h, for example.

In step S130, the controller 92 checks the first condition and the road information against each other to set the first road region. For example, the controller 92 employs the condition (a) if season information acquired by the road information acquisition portion 94 is "summer," and sets a road region which is not a crossing and where water sprinkling is recommended, as the first road region on the map information acquired by the road information acquisition portion 94 from the navigation device 70. Moreover, for example, the controller 92 employs the condition (c) if the acquired season information is "winter," and sets a road region which is not a crossing, which is a flat area where the road gradient is equal to or less than 1%, and where the speed limit is equal to or less than a threshold defined in advance, as the first road region on the map information.

Figure 4:
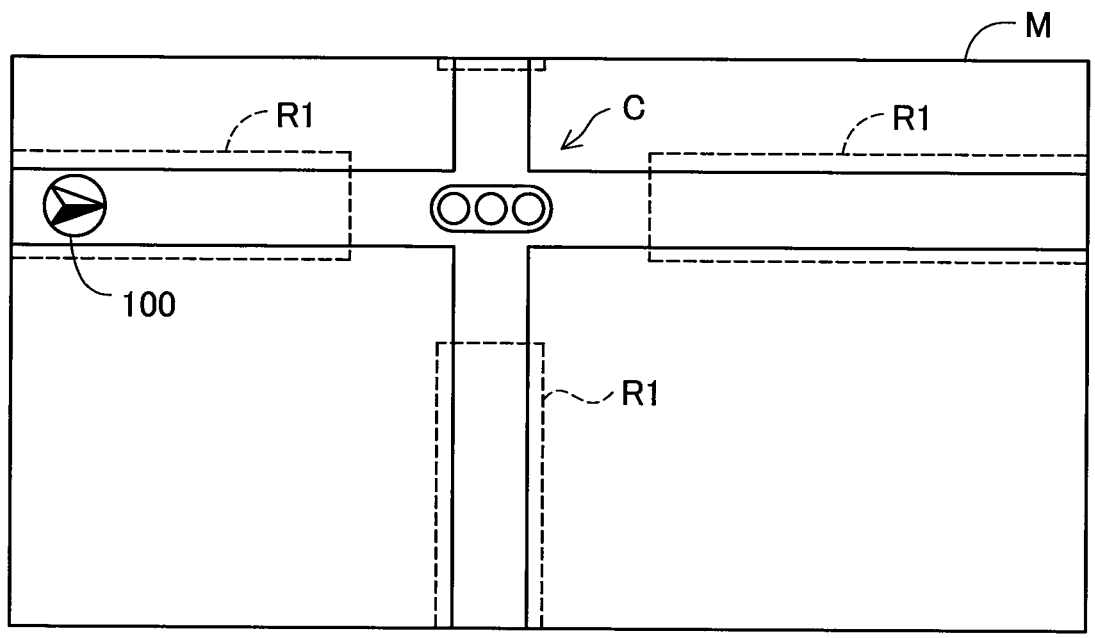
FIG. 4 is an explanatory view showing an example of a first road region.

FIG. 4 is an explanatory view showing an example of a first road region R1. FIG. 4 shows an example of the first road region R1 which is set when condition (b) is employed as the first condition. The first road region R1 is set in a region which is not crossing C. On the display screen indicating map information M possessed by the navigation device 70, the first road region R1 may be superimposed on the map information M.

As shown in FIG. 3, the controller 92 determines whether the drainage implementation condition is fulfilled (step S140). The drainage implementation condition is set in advance as a condition for the implementation of drainage and stored in the ROM of the control device 90. In the first embodiment, the drainage implementation condition is that "the fuel cell vehicle 100 is traveling in the first road region R1."

In step S140, the controller 92 determines whether the fuel cell vehicle 100 is traveling in the first road region R1 using the current positional information acquired by the navigation device 70. If the fuel cell vehicle 100 is not traveling in the first road region R1 and it is determined that the drainage implementation condition is not fulfilled (step S140: NO), the process returns to step S110. On the other hand, if the fuel cell vehicle 100 is traveling in the first road region R1 and it is determined that the drainage implementation condition is fulfilled (step S140: YES), the controller 92 performs drainage (step S150). The drainage process is finished with implementation of step S150.

According to the first embodiment, the controller 92 executes control of switching the drainage valve 42 from the closed state to the opened state to make a switch from the storage state to the drainage state in step S150. Namely, the drainage operation is performed automatically by the controller 92. When drainage is performed in the fuel cell vehicle 100, information about the drainage (hereinafter also called "drainage history information") may be notified by the communication device 80 to the external center and another vehicle through radio communication. The drainage history information is information indicating road regions where drainage has been performed, drainage amount, etc. In a vehicle having received such notification, on a display screen indicating map information possessed by a navigation device, the drainage history information may be superimposed on the map information. This allows the other vehicles to see the road region where the drainage has been performed, so that the other vehicle is allowed to travel while bypassing the road regions where drainage has been performed. By doing so, it becomes possible to reduce the occurrence of skidding caused by the road surface freezing after drainage has been performed, for example. In the fuel cell vehicle 100 which has performed the drainage, the drainage history information may also be superimposed on the map information M displayed on the screen and contained in the navigation device 70.

In the first embodiment, the gas-liquid separator 40 corresponds to a storage portion of this disclosure, the season information corresponds to temperature correlated information correlated with the road surface temperature of the road of this disclosure, and "it being summer," "it being spring or fall," and "it being winter" each correspond to a temperature correlated condition correlated with the road surface temperature of this disclosure.

In the fuel cell vehicle 100 of the first embodiment described above, the controller 92 sets the road region meeting the first condition for permitting the drainage state as the first road region R1 where the drainage state is permitted, and performs drainage if the drainage implementation condition defined in advance, including traveling of the fuel cell vehicle 100 in the first road region R1, is fulfilled. Therefore, a condition indicating a road region where drainage of produced water is desired is set as the first condition to allow discharge of the produced water to the outside of the fuel cell vehicle 100 in an appropriate road region. This achieves effective use of the produced water in the fuel cell 10 and makes it unlikely that the produced water will be drained in a road region such as the crossing C where drainage of the produced water is not desired.

Road information acquired by the road information acquisition portion 94 includes the season information as the temperature correlated information correlated with the road surface temperature of the road, and the first condition includes a condition about the season as the temperature correlated condition correlated with the road surface temperature. As a result, discharge of the produced water to the outside of the fuel cell vehicle 100 is achieved in an appropriate road region according to the season. As an example, as this permits drainage of the produced water in a region where water sprinkling is recommended when the road surface temperature is high in summer, the produced water in the fuel cell 10 is used effectively to allow suppression of temperature increase on a road surface by means of evaporation heat. As another example, this achieves the suppression of safety deterioration caused by freezing of drained water on the road surface when the road surface temperature is low in winter. Consequently, the discharge of produced water to the outside of the fuel cell vehicle 100 is achieved in an appropriate road region according to the road surface temperature.

B. Second Embodiment

The fuel cell vehicle 100 of the second embodiment differs from the fuel cell vehicle 100 of the first embodiment in the specific procedure of its drainage process. The other configurations are comparable to those of the first embodiment. Thus, the comparable configurations will be given the same signs and detailed descriptions will be omitted.

Figure 5:
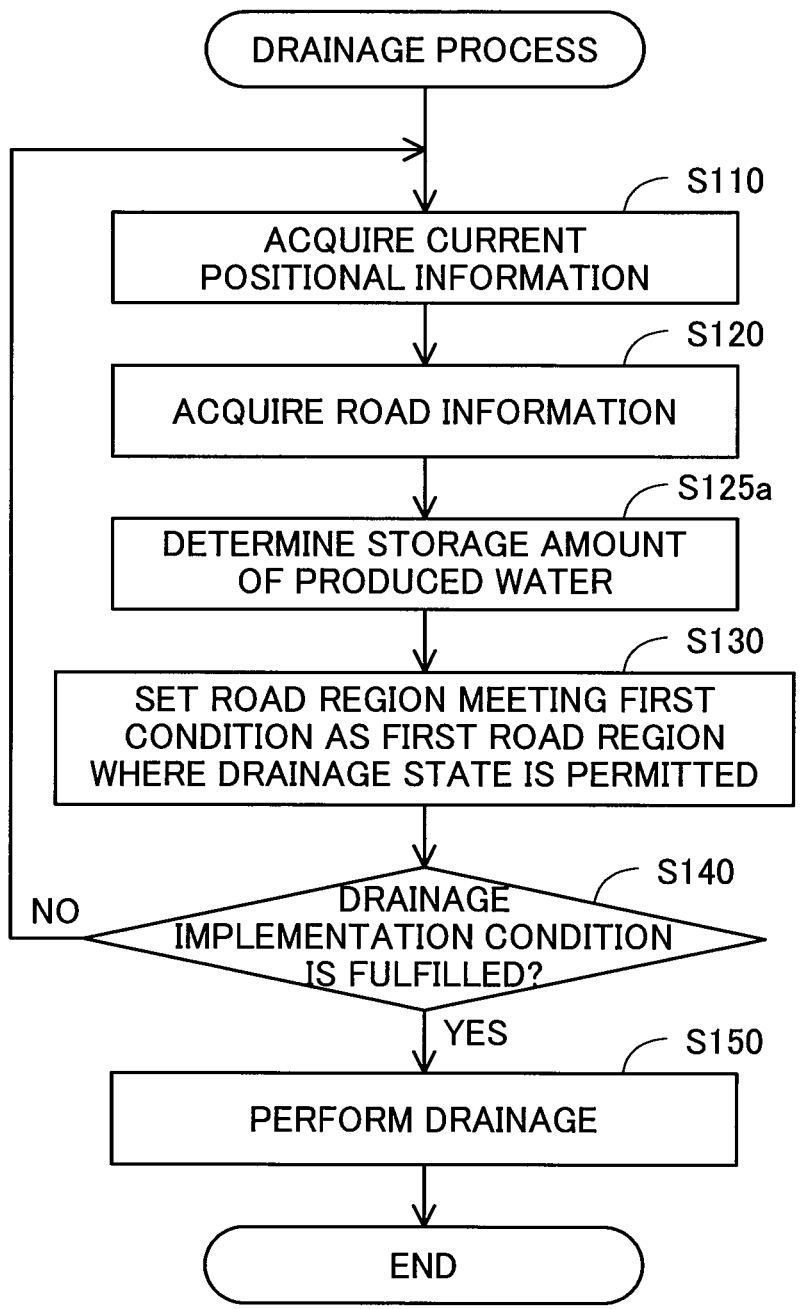
FIG. 5 is a flowchart showing procedure of a drainage process according to a second embodiment.

FIG. 5 is a flowchart showing the procedure of the drainage process according to the second embodiment. The drainage process of the second embodiment differs from the drainage process of the first embodiment in that step S125a is performed before step S130 and according to the specific contents of the first condition.

After implementation of step S120, the determination portion 96 determines the storage amount of produced water stored in the gas-liquid separator 40 (step S125a). In the second embodiment, while the determination portion 96 determines the storage amount of produced water by estimation as described above, a water level sensor may be provided at the gas-liquid separator 40 and the determination portion 96 may determine a storage amount on the basis of a detection signal from the water level sensor. The water level sensor is arranged in a position corresponding to a storage amount threshold described later, for example. Step S125a may be performed before step S110 or step S120.

The controller 92 sets a road region meeting the first condition as the first road region R1 where the drainage state is permitted (step S130).

In the second embodiment, the first condition may be an OR condition such as conditions (d) and (e) described below, for example. For the convenience of description, the following conditions shown as representatives of the first condition include "it being winter" as a part of the first condition:

(d) It being winter, and it being a road region which is not a crossing, in a flat area where the road gradient is equal to or less than 1%, and where the speed limit is equal to or less than 60 km/h (to be employed if the storage amount of produced water exceeds the storage amount threshold);

(e) It being winter, and it being a road region which is not a crossing, in a flat area, and where the speed limit is equal to or less than 40 km/h (to be employed if the storage amount of produced water is equal to or less than the storage amount threshold).

The storage amount threshold is set in advance as a value indicating a smaller amount than permissible storage upper limit of produced water in the gas-liquid separator 40, and is stored in the ROM of the control device 90. In step S130, the controller 92 employs the condition (d) if the storage amount of the produced water determined in step S125a by the determination portion 96 exceeds the storage amount threshold, and employs the condition (e) if the determined storage amount is equal to or less than the storage amount threshold. The controller 92 sets a road region matching the employed first condition as the first road region R1.

The condition (d) includes restrictive conditions about speed limits than the condition (e). Thus, road regions matching condition (d) are wider than road regions matching condition (e).

The controller 92 determines whether the drainage implementation condition is fulfilled (step S140). If the fuel cell vehicle 100 is not traveling in the first road region R1 and it is determined that the drainage implementation condition is not fulfilled (step S140: NO), the process returns to step S110. On the other hand, if the fuel cell vehicle 100 is traveling in the first road region R1 and it is determined that the drainage implementation condition is fulfilled (step S140: YES), the controller 92 performs drainage (step S150).

The fuel cell vehicle 100 of the second embodiment described above achieves effect comparable to that of the first embodiment. Additionally, as the controller 92 employs the first condition according to the storage amount of produced water and sets a road region meeting the first condition as the first road region R1, the set first road region R1 becomes responsive to the storage amount of the produced water. More specifically, a wider region is set as the first road region R1 when the storage amount is larger than a region set if the storage amount is smaller, thereby allowing drainage in a wider region in cases when the storage amount than in the case of the smaller storage amount. This makes it possible to reduce the likelihood of the storage amount unintentionally exceeding a permissible storage upper limit in the gas-liquid separator 40 in a road region where a storage state is to be produced to make drainage unavoidable. This further makes it possible to discharge the produced water in a more appropriate road region in the presence of a margin in the storage amount in the gas-liquid separator 40.

C. Third Embodiment

Figure 6:
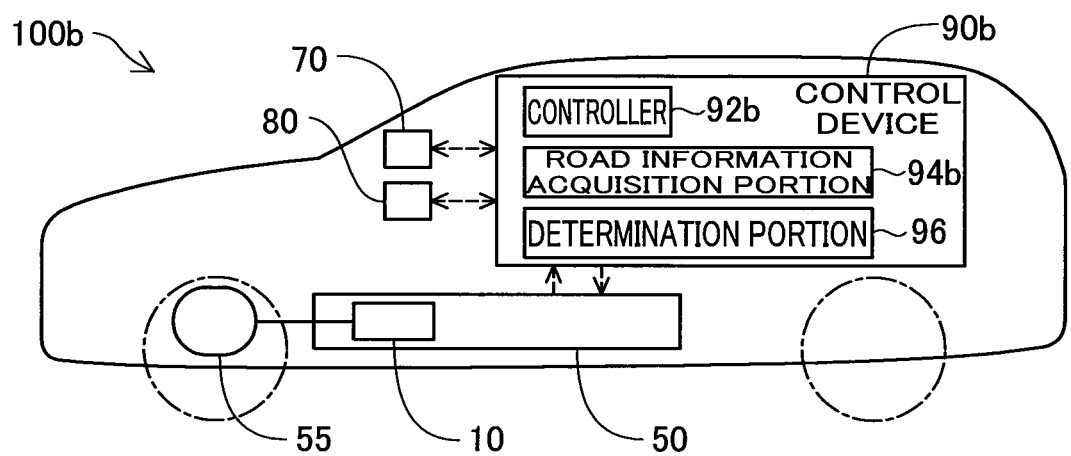
FIG. 6 is a block diagram showing a schematic configuration of a fuel cell vehicle according to a third embodiment.

FIG. 6 is a block diagram showing a schematic configuration of a fuel cell vehicle 100*b* according to a third embodiment. The fuel cell vehicle 100*b* of the third embodiment differs from the fuel cell vehicle 100 of the first embodiment in that it includes a control device 90*b* instead of the control device 90 and in the specific contents of the first condition. The other configurations including a specific procedure of a drainage process are comparable to those of the first embodiment. Thus, the comparable configurations will be given the same signs and detailed descriptions will be omitted.

A road information acquisition portion 94*b* of the control device 90*b* acquires drainage history information as one type of road information through the communication device 80. In the third embodiment, the drainage history information means information about a history of drainage to a road performed by a fuel cell vehicle different from the fuel cell vehicle 100*b*. The communication device 80 receives such drainage history information from an external center through radio communication. However, such drainage information is not only received from the external center, but it may be received from other fuel cell vehicles.

In the third embodiment, the first condition may be a condition such as condition (f) described below, for example. For the convenience of description, the following condition shown as a representative of the first condition includes "it being winter" as a part of the first condition:

(f) It being winter, it being a road region which is not at a crossing, in a flat area where the road gradient is equal to or less than 1%, and where the speed limit is equal to or less than a threshold defined in advance, and the number of times drainage has been performed by a different fuel cell vehicle in a predetermined period is equal to or less than the threshold.

The threshold is set in advance as a value for preventing the implementation of drainage by a plurality of fuel cell vehicles in a concentrated manner in a particular road region, and is stored in a ROM of the control device 90*b*. In the third embodiment, the threshold is set as a value indicating the number of times drainage has been performed by a different fuel cell vehicle in a predetermined period and is set at five times, for example. Namely, if the different fuel cell vehicle has performed drainage five times or more in a road region, this road region is not suitable as a first road region.

The threshold is not limited to the number of times drainage has been performed but it may also be a value indicated by a drainage amount. Specifically, the threshold may be a value correlated with the drainage amount to a road by a different fuel cell vehicle. If the drainage history information is to be received from the external center, the external center may calculate the total of the number of times drainage has been performed by a plurality of different fuel cell vehicles or the total amount of drainage by these fuel cell vehicles. If the drainage history information is to be received from a different fuel cell vehicle, the road information acquisition portion 94*b* may calculate the total of the number of times drainage has been performed by a plurality of different fuel cell vehicles or the total amount of drainage by these fuel cell vehicles.

The fuel cell vehicle 100*b* of the third embodiment described above achieves effect comparable to that of the first embodiment. Additionally, the road information includes the drainage history information, and the first condition includes a condition that a value correlated with an amount of drainage to a road by a different fuel cell vehicle is equal to or less than a threshold defined in advance. This allows the controller 92*b* to set a region as the first road region where the drainage by other fuel cell vehicles is little. This makes it possible to reduce a likelihood that drainage will be performed in a concentrated manner by a plurality of fuel cell vehicles in a particular road region.

D. Fourth Embodiment

Figure 7:
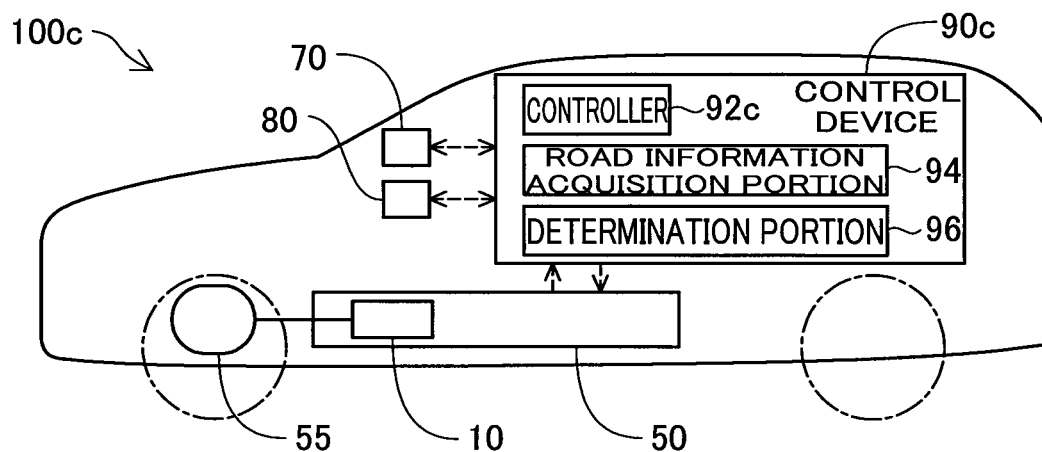
FIG. 7 is a block diagram showing a schematic configuration of a fuel cell vehicle according to a fourth embodiment.

FIG. 7 is a block diagram showing a schematic configuration of a fuel cell vehicle 100*c* according to a fourth embodiment. The fuel cell vehicle 100*c* of the fourth embodiment differs from the fuel cell vehicle 100 of the first embodiment in that it includes a control device 90*c* instead of the control device 90 and in a specific procedure of the drainage process. The other configurations are comparable to those of the first embodiment. Thus, the comparable configurations will be given the same signs and detailed descriptions will be omitted.

In the fourth embodiment, the first condition includes a first preferential condition and a second preferential condition as OR conditions. The first preferential condition and the second preferential condition are set in advance as conditions differing from each other, and are stored in a ROM of the control device 90*c*. The control device 90*c* of the fourth embodiment includes a controller 92*c* that performs the drainage process of performing drainage in a road region of a first road region meeting the first preferential condition preferentially over a road region of the first road region meeting the second preferential condition.

Figure 8:
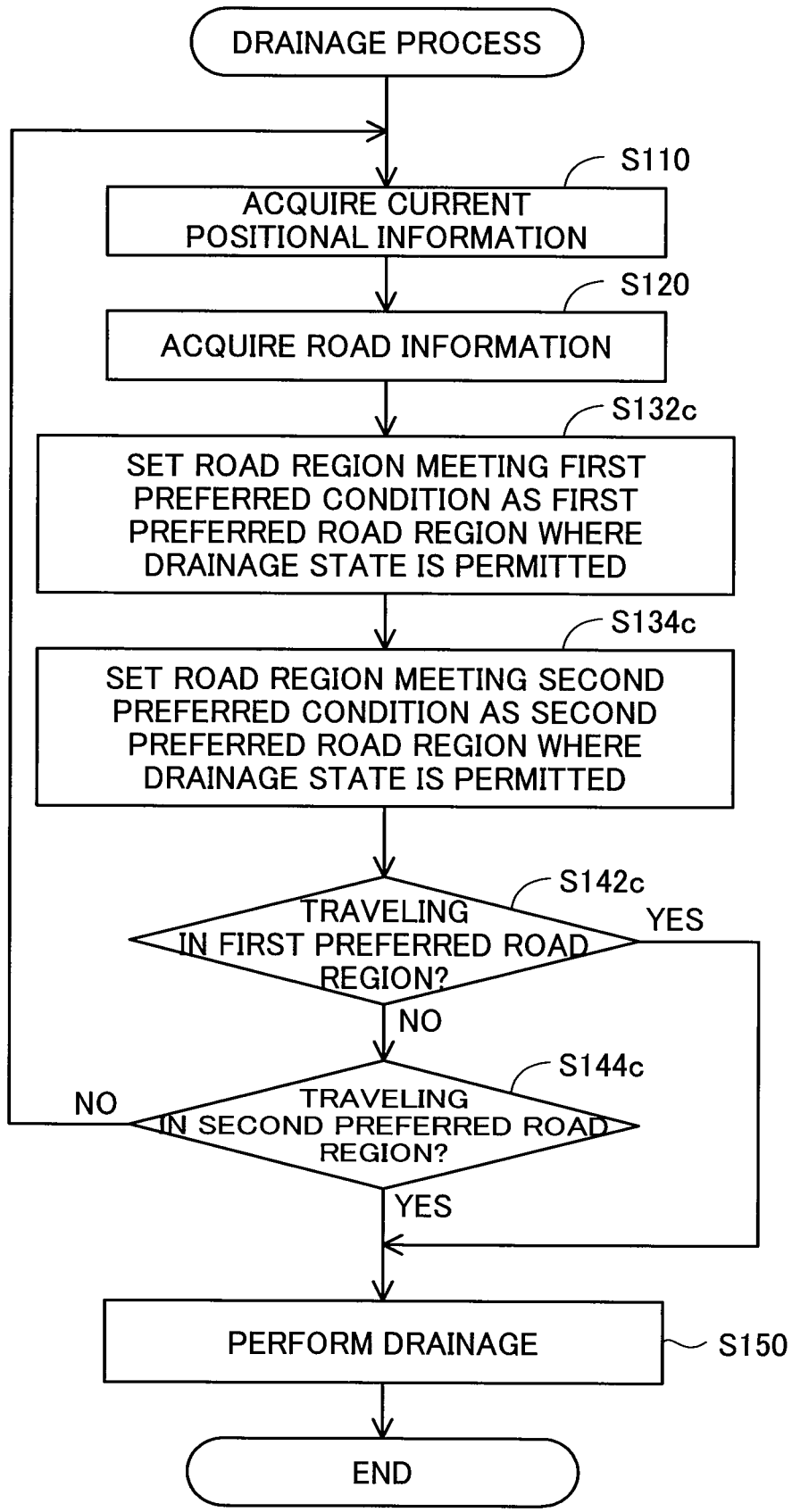
FIG. 8 is a flowchart showing a procedure of a drainage process according to the fourth embodiment.

FIG. 8 is a flowchart showing a procedure of the drainage process according to the fourth embodiment. The drainage process of the fourth embodiment differs from the drainage process of the first embodiment in that steps from S132*c* to S144*c* are performed instead of the steps from S130 to S140, and in the specific contents of the first condition.

After implementation of step S120, the controller 92*c* sets a road region meeting the first preferential condition as a first preferential road region where the drainage state is permitted (step S132*c*). The controller 92*c* sets a road region meeting the second preferential condition as a second preferential road region where the drainage state is permitted (step S134*c*). The first preferential road region and the second preferential road region are both included in the first road region.

In the fourth embodiment, the first preferential condition may be a condition such as condition (g) described below, for example, and the second preferential condition may be a condition such as condition (h) described below, for example:

(g) Not being a crossing and being a gravel road;
(h) Not being a crossing and being a paved road.

Paved roads include roads paved with asphalt, roads paved with concrete, etc. Gravel roads possess greater water permeability than paved roads. Hence, compared to drainage onto the road surface of paved roads, produced water drained onto the road surface of gravel roads penetrates easily into the ground, thus suppressing retention of produced water on the road surface. In view of this, a condition such as the foregoing condition (g) is set as the first preferential condition so as to perform drainage on gravel roads preferentially over pavement.

The controller $92c$ determines whether the fuel cell vehicle $100c$ is traveling in the first preferential road region (step S142$c$). In step S142$c$, if it is determined whether a condition that "the fuel cell vehicle $100c$ is traveling in the first preferential road region" is fulfilled as a drainage implementation condition. If it is determined that the fuel cell vehicle $100c$ is traveling in the first preferential road region (step S142$c$: YES), namely, if it is determined that the drainage implementation condition is fulfilled, the controller $92c$ performs drainage (step S150). Then, the drainage of produced water is performed in the first preferential road region.

In step S142$c$, if it is determined that the fuel cell vehicle $100c$ is not traveling in the first preferential road region (step S142$c$: NO), namely, if it is determined that the drainage implementation condition is not fulfilled, the controller $92c$ determines whether the fuel cell vehicle $100c$ is traveling in the second preferential road region (step S144$c$). As a result of the implementation of step S142$c$ and step S144$c$, the controller $92c$ determines the fulfillment of the drainage implementation condition that "the fuel cell vehicle $100c$ is not traveling in the first preferential road region and is traveling in the second preferential road region." If it is determined that the fuel cell vehicle $100c$ is not traveling in the second preferential road region (step S144$c$: NO), namely, if it is determined the drainage implementation condition is not fulfilled, the process returns to step S110.

If it is determined in step S144$c$ that the fuel cell vehicle $100c$ is traveling in the second preferential road region (step S144$c$: YES), namely, if it is determined that the drainage implementation condition is fulfilled, the controller $92c$ performs drainage (step S150). Then, the drainage of produced water is performed in the second preferential road region. In this way, the controller $92c$ performs drainage in the first preferential road region of the first road region meeting the first preferential condition preferentially over the second preferential road region of the first road region meeting the second preferential condition.

The fuel cell vehicle $100c$ of the fourth embodiment described above achieves effect comparable to that of the first embodiment. Additionally, the first condition includes the first preferential condition and the second preferential condition, and the controller $92c$ performs drainage in the first preferential road region of the first road region meeting the first preferential condition preferentially over the second preferential road region of the first road region meeting the second preferential condition. Thus, by adjusting the first preferential condition and the second preferential condition, it becomes possible to drain produced water in a more appropriate road region.

E. Fifth Embodiment

Figure 9:
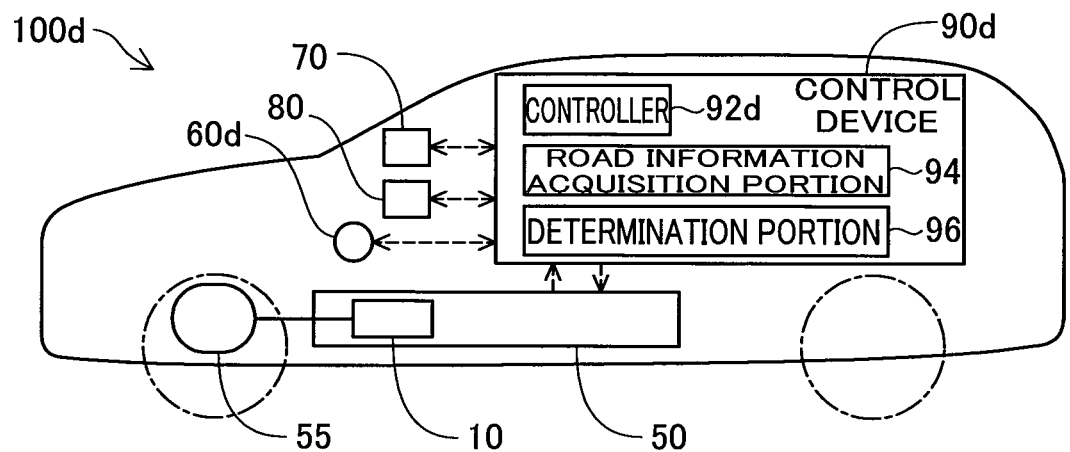
FIG. 9 is a block diagram showing a schematic configuration of a fuel cell vehicle according to a fifth embodiment.

FIG. 9 is a block diagram showing a schematic configuration of a fuel cell vehicle $100d$ according to a fifth embodiment. The fuel cell vehicle $100d$ of the fifth embodiment differs from the fuel cell vehicle 100 of the first embodiment in that it further includes a drainage switch $60d$ in order to trigger the start of the drainage operation manually, in that it includes a control device $90d$ instead of the control device 90, and in a specific procedure of the drainage process. The other configurations are comparable to those of the first embodiment. Thus, the comparable configurations will be given the same signs and detailed descriptions will be omitted.

The drainage switch $60d$ is a switch for switching from the storage state to the drainage state, namely, for instructing the implementation of drainage. The drainage switch $60d$ is switched between an active state and an inactive state by a controller $92d$. The active state of the drainage switch $60d$ permits a passenger to press the drainage switch $60d$. If the drainage switch $60d$ is pressed in this state, the drainage valve 42 is switched from the closed state to the opened state through the controller $92d$. On the other hand, the inactive state of the drainage switch $60d$ prohibits press of the drainage switch $60d$ by the passenger. In this state, drainage is not performed even if the passenger tries to press the drainage switch $60d$ for the drainage.

In the fifth embodiment, the drainage switch $60d$ is brought to the active state when the controller $92d$ permits the drainage state and to the inactive state when the controller $92d$ prohibits the drainage state, as will be described later. A passenger may be notified of whether the drainage switch $60d$ is in the active state or in the inactive state by a change in the color of the displayed drainage switch $60d$ or by voice, for example. Thus, when the drainage switch $60d$ is in the active state, the passenger is able to know that drainage of produced water is recommended and to know when to press the drainage switch $60d$.

The controller $92d$ of the control device $90d$ of the fifth embodiment further sets a second road region where the storage state is to be produced in the drainage process.

Figure 10:
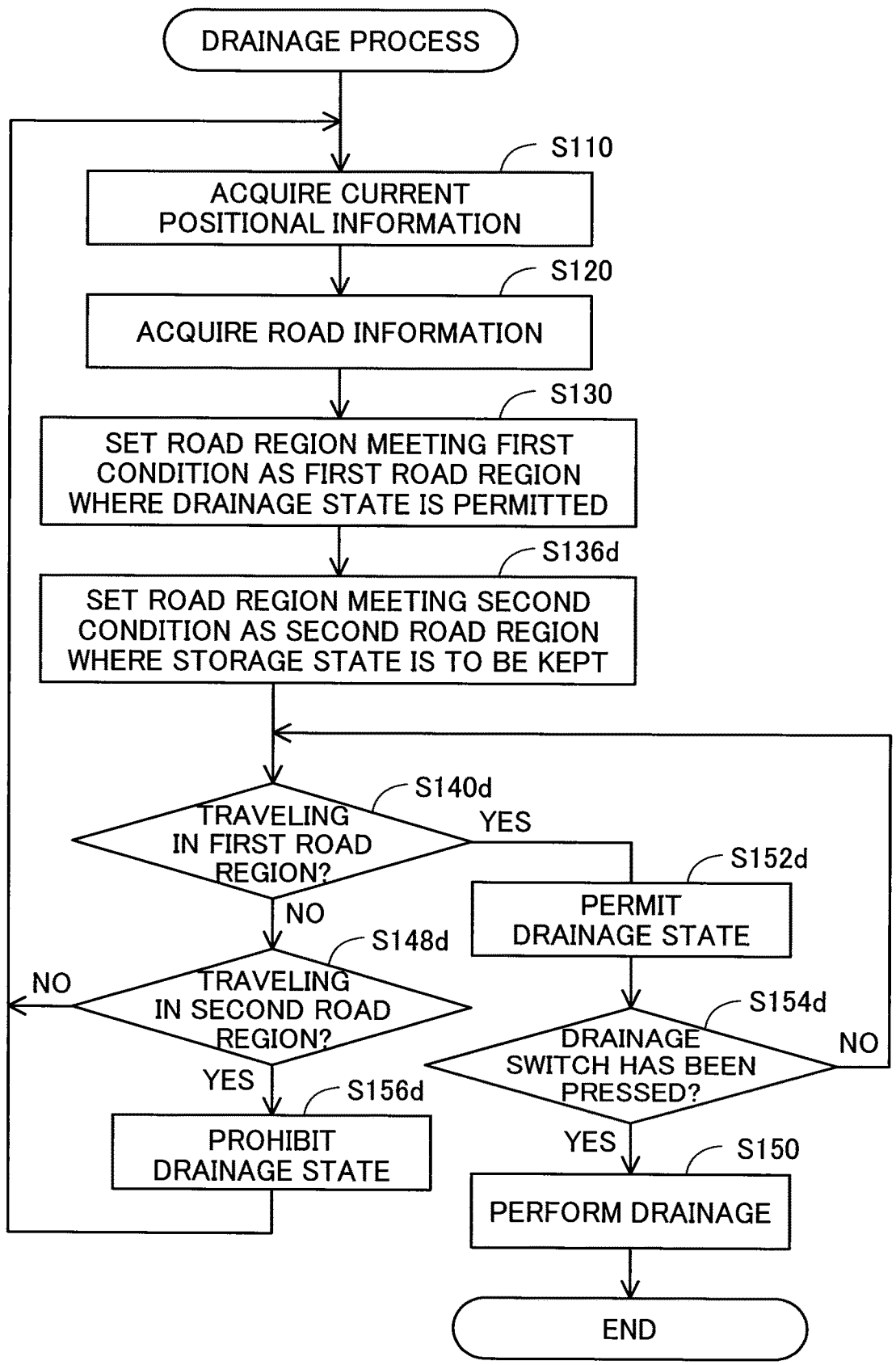
FIG. 10 is a flowchart showing a procedure of a drainage process according to the fifth embodiment.

FIG. 10 is a flowchart showing a procedure of the drainage process according to the fifth embodiment. Like the drainage process of the first embodiment, the drainage process of the fifth embodiment is performed as a trigger in response to excess of a storage amount of produced water stored in the gas-liquid separator 40 and determined by the determination portion 96 over a predetermined amount. In the fifth embodiment, the drainage switch $60d$ is in the inactive state at the start of the drainage process. Like in the first embodiment, after implementation of step S120, the controller $92d$ sets a road region meeting the first condition as the first road region where the drainage state is permitted (step S130). Then, the controller $92d$ sets a road region meeting a second condition as the second road region where the storage state is to be produced (step S136$d$).

The second condition is defined in advance as a condition related to road information and as a condition for producing the storage state, and is stored in a ROM of the control device $90d$. The second condition may be acquired through the communication device 80 from an external center. The second condition may be a condition such as a condition (i) described below, for example:

(i) Being at a crossing.

In step S136$d$, the controller $92d$ checks the second condition and road information against each other to set the second road region. On a display screen indicating map information possessed by the navigation device 70, the second road region may be superimposed on the map information.

The controller $92d$ determines whether the fuel cell vehicle $100d$ is traveling in the first road region (step S140$d$). In step S140$d$, the controller $92d$ determines whether the fuel cell vehicle 100d is traveling in the first road region using current positional information acquired by the navigation device 70. If it is determined that the fuel cell vehicle 100d is traveling in the first road region (step S140d: YES), the controller 92d permits the drainage state (step S152d). As a result of the implementation of step S152d, the drainage switch 60d is switched from the inactive state to the active state and the switching of the drainage switch 60d to the active state is notified to the passenger.

The controller 92d determines whether the drainage switch 60d has been pressed (step S154d). If it is determined that the drainage switch 60d has not been pressed (step S154d: NO), the process returns to step S140d. On the other hand, if it is determined that the drainage switch 60d has been pressed (step S154d: YES), the controller 92d performs drainage (step S150). In the fifth embodiment, drainage is performed if both step S140d and step S154d are determined as YES. As a result of implementation of step S140d and step S154d, the controller 92d determines the fulfillment of a drainage implementation condition that "the fuel cell vehicle 100d is traveling in the first road region and the drainage switch 60d has been pressed."

If it is determined in step S140d that the fuel cell vehicle 100d is not traveling in the first road region (step S140d: NO), the controller 92d determines whether the fuel cell vehicle 100d is traveling in the second road region (step S148d). If it is determined that the fuel cell vehicle 100d is not traveling in the second road region (step S148d: NO), the process returns to step S110. On the other hand, if it is determined that the fuel cell vehicle 100d is traveling in the second road region (step S148d: YES), the controller 92d prohibits the drainage state (step S156d). In the fifth embodiment, as the drainage switch 60d is in the inactive state at the start of the drainage process, the inactive state of the drainage switch 60d is maintained in step S156d. In this case, even if the passenger tries to press the drainage switch 60d during traveling in the second road region, drainage is not performed. Namely, the controller 92d does not perform drainage in the second road region. After implementation of step S156d, the process returns to step S110.

The fuel cell vehicle 100d of the fifth embodiment described above achieves effect comparable to that of the first embodiment. Additionally, the controller 92d sets a road region meeting the second condition for producing the storage state as the second road region where the storage state is to be produced, and does not perform drainage in the second road region. This makes it unlikely that produced water will be drained in a road region where drainage of the produced water is not desired.

F. Other Embodiments

F-1. Another Embodiment 1

The first condition, the first preferential condition, the second preferential condition, and the second condition described in the foregoing embodiments are merely described as examples and are modifiable in various ways. For example, in the foregoing first embodiment, the first condition may be a condition such as a condition (j) described below:

(j) Being a road region designated by an external center.

Employing this condition allows setting of a road region designated by the external center as the first road region. This makes it possible to perform the discharge of produced water to the outside of the fuel cell vehicle 100 in a more appropriate road region according to road conditions such as traffic congestion.

F-2. Another Embodiment 2

In the foregoing first to third embodiments, road information acquired by the road information acquisition portion 94 or 94b includes season information and the first condition includes a condition related to the season. However, this is not intended to limit this disclosure. For example, a weather forecast acquired by the road information acquisition portion 94 or 94b may include current temperature information about the region including the current position of the fuel cell vehicle 100, 100b, or 100c, and the road information acquisition portion 94 or 94b may be configured to acquire such temperature information as one type of road information. In this configuration, the first condition may be a condition such as conditions (a2), (b2), or (c2) described below including temperature correlated conditions correlated with a road surface temperature, for example:

(a2) The outside air temperature being equal to or more than 35° C., and being a road region which is not at a crossing and where water sprinkling is recommended;

(b2) The outside air temperature being equal to or more than 0° C. and less than 35° C., and being a road region which is not at a crossing;

(c2) The outside air temperature being less than 0° C., and being a road region which is not at a crossing, in a flat area where the road gradient is equal to or less than 1%, and where the speed limit is equal to or less than a threshold defined in advance.

The current temperature information corresponds to the temperature correlated information of this disclosure, and "an outside air temperature equal to or more than 35° C.," "an outside air temperature equal to or more than 0° C. and less than 35° C.," and "an outside air temperature of less than 0° C." corresponds to the temperature correlated condition of this disclosure. The temperature correlated condition correlated with a road surface temperature is omissible from the first condition and the first condition may be set as a common condition regardless of the season or temperature. This configuration achieves effects comparable to those of the first to third embodiments described above.

F-3. Another Embodiment 3

In each of the foregoing embodiments, the road information acquisition portion 94 or 94b receives and acquires map information possessed by the navigation device 70 and information acquired by the communication device 80. However, this is not intended to limit this disclosure. As an example, road information may be acquired by receiving one of the pieces of map information possessed by the navigation device 70 or the information acquired by the communication device 80. As another example, the fuel cell vehicle 100, 100a, 100b, 100c, or 100d may include an outside air temperature sensor for detecting the outside air temperature in the environment where the fuel cell vehicle 100, 100a, 100b, 100c, or 100d is traveling, and the road information acquisition portion 94 or 94b may acquire information about the outside air temperature detected by such an outside air temperature sensor as one type of road information. As another example, the fuel cell vehicle 100, 100a, 100b, 100c, or 100d may include a monitoring sensor for acquiring information about the road ahead of the fuel cell vehicle 100, 100a, 100b, 100c, or 100d, and the road information acquisition portion 94 or 94b may acquire information detected by such a monitoring sensor as one type of road information. The monitoring sensor may be configured using any type of sensor such as an imaging camera, a radio wave radar, a laser radar, or an ultrasonic sensor, for example, and may be configured to allow detection of the presence or absence of a crossing or a gravel road, for example. The configuration in which the road information acquisition portion 94 or 94b acquires the result of detection by the outside air temperature sensor or the monitoring sensor achieves effect comparable to that of each of the embodiments described above, and eliminates the need to communicate with an external center, for example.

F-4. Another Embodiment 4

In the fuel cell vehicles 100, 100a, 100b, and 100c of the foregoing first to fourth embodiments, drainage operation is performed automatically by the controllers 92, 92b, and 92c respectively. Alternatively, like in the foregoing fifth embodiment, the fuel cell vehicles 100, 100a, 100b, and 100c may each be provided with a drainage switch and may be configured as a trigger to start the drainage operation on the basis of an instruction from the passenger. In this configuration, the drainage switch is brought to an active state when the drainage state is permitted and to an inactive state when the drainage state is not permitted. Moreover, in this configuration, a drainage implementation condition may be a condition that "the fuel cell vehicle 100 or 100b is traveling in the first road region and the drainage switch has been pressed," a condition that "the fuel cell vehicle 100c is traveling in the first preferential road region and the drainage switch has been pressed," or a condition that "the fuel cell vehicle 100c is traveling in the second preferential road region and the drainage switch has been pressed." In the fuel cell vehicle 100d of the fifth embodiment described above, the drainage operation is started on the basis of press of the drainage switch 60d by a passenger as a trigger. However, like in the foregoing first to fourth embodiments, the drainage switch 60d may be omitted and the drainage operation may be performed automatically by the controller 92d. This configuration achieves effect comparable to that of each of the embodiments described above.

F-5. Another Embodiment 5

In the fuel cell vehicle 100c of the foregoing fourth embodiment, drainage is performed in the second preferential road region if it is determined that the fuel cell vehicle 100c is traveling in the second preferential road region. However, this is not intended to limit this disclosure. For example, the fuel cell vehicle 100c may be configured in such a manner that, if it is determined that the fuel cell vehicle 100c is traveling in the second preferential road region, it is also determined whether the fuel cell vehicle 100c is planned to travel further in the first preferential road region. In this configuration, the process may be returned to step S110 if it is determined that the fuel cell vehicle 100c is planned to travel in the first preferential road region, and drainage may be performed in the second preferential road region if it is determined that the fuel cell vehicle 100c is not planned to travel in the first preferential road region. Namely, a drainage implementation condition for drainage in the second preferential road region may be a condition that "the fuel cell vehicle 100c is traveling in the second preferential road region and is not planned to travel in the first preferential road region." The presence or absence of a plan for the fuel cell vehicle 100c to travel in the first preferential road region may be determined on the basis of destination information set by the passenger using the navigation device 70. For example, this determination may be made on the basis of whether the first preferential road region exists in a predetermined range extending along the traveling route from the current position of the fuel cell vehicle 100c to the destination and starting from the current position of the fuel cell vehicle 100c. In this configuration, drainage is performed in the first preferential road region if it is determined that the fuel cell vehicle 100c is planned to travel in the first preferential road region, and drainage is performed in the second preferential road region if it is determined that the fuel cell vehicle 100c is not planned to travel in the first preferential road region. This configuration also allows implementation of drainage in the first preferential road region preferentially over the second preferential road region.

F-6. Another Embodiment 6

The drainage process in each of the foregoing embodiments is performed as a trigger in response to excess of a storage amount of produced water stored in the gas-liquid separator 40 over a predetermined amount. However, this is not intended to limit this disclosure. For example, the drainage process may be performed repeatedly at a predetermined interval by the controller 92, 92b, or 92c in a period from when a start switch not shown in the drawings for starting the fuel cell vehicle 100, 100b, 100c, or 100d is turned on to when the start switch is turned off. The predetermined interval may be one second, for example. This configuration achieves effect comparable to that of each of the embodiments described above, and makes the determination portion 96 omissible in the first and third to fifth embodiments.

F-7. Another Embodiment 7

While produced water is stored in the gas-liquid separator 40 in each of the foregoing embodiments, the produced water is not always required to be stored in the gas-liquid separator 40 but may be stored in any storage portion available for the storing of produced water. For example, the storage portion may be provided between the gas-liquid separator 40 and the drainage valve 42, and a humidifier tank for humidifying the space inside the vehicle may function as the storage portion. As another example, a second gas-liquid separator available to separate produced water by means of centrifugal separation or a baffle may be provided inside the muffler 26, and the storage portion and the drainage valve may be provided downstream from the second gas-liquid separator. Namely, each of the fuel cell vehicles 100 and 100b to 100d may generally include the storage portion that stores produced water which is produced as a result of power generation by the fuel cell 10, and the drainage valve for switching between the storage state of storing the produced water in the storage portion and the drainage state of discharging the produced water from the storage portion to the outside of the fuel cell vehicles 100 and 100b to 100d. This configuration achieves effect comparable to that of each of the embodiments described above.

This disclosure is not limited to the foregoing embodiments but is feasible in the form of various configurations within a range not deviating from the substance of this disclosure. For example, technical features in the embodiments corresponding to those in each of the aspects described in SUMMARY may be replaced or combined, where appropriate, with the intention of solving some or all of the aforementioned problems or achieving some or all of the aforementioned effects. Unless being described as required in this specification, these technical features may be deleted, where appropriate. For example, this disclosure may be realized according to the following configurations.

(1) According to an aspect of this disclosure, a fuel cell vehicle is provided. The fuel cell vehicle includes: a fuel cell; a storage portion configured to store produced water that is produced as a result of power generation by the fuel cell; a drainage valve for switching between a storage state of storing the produced water in the storage portion and a drainage state of discharging the produced water from the storage portion to the outside of the fuel cell vehicle; a road information acquisition portion configured to acquire road information about roads on which the fuel cell vehicle travels; and a controller configured to control operation of the drainage valve. The controller sets a road region meeting a first condition (defined in advance) regarding road information, that permits the drainage state as a first road region where the drainage state is permitted, and the controller performs drainage if a drainage implementation condition defined in advance, including traveling of the fuel cell vehicle in the first road region, is fulfilled. In the fuel cell vehicle of this aspect, the controller sets a road region meeting the first condition which permits the drainage state as the first road region where the drainage state is permitted, and performs drainage if the drainage implementation condition defined in advance, including traveling of the fuel cell vehicle, in the first road region is fulfilled. This allows discharge of the produced water to the outside of the fuel cell vehicle in an appropriate road region.

(2) In the fuel cell vehicle of the foregoing aspect, the road information may include temperature correlated information correlated with a road surface temperature of the road, and the first condition may include a temperature correlated condition correlated with the road surface temperature. In the fuel cell vehicle according to this aspect, the road information includes the temperature correlated information correlated with the road surface temperature of the road, and the first condition includes the temperature correlated condition correlated with the road surface temperature. This makes it possible to discharge the produced water to the outside of the fuel cell vehicle in an appropriate road region according to the road surface temperature.

(3) In the fuel cell vehicle of the foregoing aspect, the fuel cell vehicle may further include a determination portion configured to determine a storage amount of the produced water stored in the storage portion, and the controller may set a wider region as the first road region if the determined storage amount is larger than when the storage amount is smaller. In the fuel cell vehicle of this aspect, the controller sets a wider region as the first road region if the determined storage amount is larger than when the storage amount is smaller. This makes it possible to reduce the likelihood that the storage amount will unintentionally exceed the permissible storage upper limit in the storage portion in a road region where the storage state is to be produced to thus making drainage unavoidable. This further makes it possible to discharge the produced water in a more appropriate road region in the presence of a margin in the storage amount.

(4) In the fuel cell vehicle of the foregoing aspect, the road information may include drainage history information about a history of drainage to the road performed by a different fuel cell vehicle different from the fuel cell vehicle, and the first condition may include a condition that a value correlated with a drainage amount of the drainage to the road performed by the different fuel cell vehicle is equal to or less than a threshold defined in advance. In the fuel cell vehicle of this aspect, the road information includes the drainage history information about a history of drainage to the road performed by the different fuel cell vehicle different from the fuel cell vehicle, and the first condition includes the condition that a value correlated with a drainage amount of the drainage to the road performed by the different fuel cell vehicle is equal to or less than the threshold defined in advance. This allows the controller to set a region as the first road region where the drainage by the different fuel cell vehicle is little. This makes it possible to reduce a likelihood that drainage will be performed in a concentrated manner by a plurality of fuel cell vehicles in a particular road region.

(5) In the fuel cell vehicle of the foregoing aspect, the first condition may include a first preferential condition defined in advance and a second preferential condition defined in advance and different from the first preferential condition as OR conditions, and the controller may perform the drainage in a first preferential road region of the first road region meeting the first preferential condition preferentially over a second preferential road region of the first road region meeting the second preferential condition. In the fuel cell vehicle of this aspect, the first condition includes the first preferential condition and the second preferential condition as OR conditions, and the controller performs the drainage in the first preferential road region meeting the first preferential condition preferentially over the second preferential road region meeting the second preferential condition. Thus, by adjusting the first preferential condition and the second preferential condition, it becomes possible to drain the produced water in a more appropriate road region.

(6) In the fuel cell vehicle of the foregoing aspect, the controller may further set a road region meeting a second condition defined in advance about the road information and for producing the storage state as a second road region where the storage state is to be produced, and the drainage may not be performed in the second road region. In the fuel cell vehicle of this aspect, the controller sets a road region meeting the second condition for producing the storage state as the second road region where the storage state is to be produced, and the drainage is not performed in the second road region. This makes it unlikely that the produced water will be drained in a road region where drainage of the produced water is not desired.

This disclosure is feasible in various aspects. For example, this disclosure is feasible in aspects such as a method of controlling a fuel cell vehicle and a drainage timing determination system for a fuel cell vehicle, for example.

What is claimed is:

1. A fuel cell vehicle comprising:
a fuel cell;
a storage portion configured to store produced water that is produced as a result of power generation by the fuel cell;
a drainage valve for switching between a storage state of storing the produced water in the storage portion and a drainage state of discharging the produced water from the storage portion to the outside of the fuel cell vehicle;

a road information acquisition portion configured to acquire road information about roads on which the fuel cell vehicle travels, wherein the road information includes drainage history information about a history of drainage to the road performed by another fuel cell vehicle; and a controller configured to control operation of the drainage valve, wherein the controller sets a road region meeting a first condition defined in advance regarding road information and that permits the drainage state as a first road region where the drainage state is permitted, wherein the first condition includes a condition that a value correlated with a drainage amount of the drainage to the road performed by the another fuel cell vehicle is equal to or less than a threshold defined in advance, and the controller performs drainage if a drainage implementation condition defined in advance, including traveling of the fuel cell vehicle in the first road region is fulfilled.

2. The fuel cell vehicle according to claim 1, wherein the road information includes temperature correlated information correlated with a road surface temperature of the road, and the first condition includes a temperature correlated condition correlated with the road surface temperature.

3. The fuel cell vehicle according to claim 1, further comprising:

a determination portion configured to determine a storage amount of the produced water stored in the storage portion, wherein the controller sets a wider region as the first road region if the determined storage amount is larger than when the storage amount is smaller.

4. The fuel cell vehicle according to claim 1, wherein the controller further sets a road region meeting a second condition defined in advance about the road information and for producing the storage state as a second road region where the storage state is to be produced, and the drainage is not performed in the second road region.

* * * * *